United States Patent
Kracum et al.

(10) Patent No.: US 11,466,589 B2
(45) Date of Patent: Oct. 11, 2022

(54) ENVIRONMENTAL BARRIER COATING WITH POROUS BOND COAT LAYER

(71) Applicant: United Technologies Corporation, Farmington, CT (US)

(72) Inventors: Michael R. Kracum, Manchester, CT (US); Xia Tang, West Hartford, CT (US); Richard Wesley Jackson, Mystic, CT (US); Zhongfen Ding, South Windsor, CT (US); James T. Beals, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 193 days.

(21) Appl. No.: 16/722,050

(22) Filed: Dec. 20, 2019

(65) Prior Publication Data
US 2021/0189904 A1 Jun. 24, 2021

(51) Int. Cl.
| | |
|---|---|
| *F01D 25/08* | (2006.01) |
| *B05D 3/00* | (2006.01) |
| *C04B 41/52* | (2006.01) |
| *C04B 41/89* | (2006.01) |
| *C04B 41/50* | (2006.01) |

(52) U.S. Cl.
CPC .......... *F01D 25/08* (2013.01); *B05D 3/007* (2013.01); *C04B 41/5024* (2013.01); *C04B 41/5035* (2013.01); *C04B 41/52* (2013.01); *C04B 41/89* (2013.01); *F05D 2220/32* (2013.01); *F05D 2230/90* (2013.01)

(58) Field of Classification Search
None
See application file for complete search history.

(56) References Cited

U.S. PATENT DOCUMENTS

| | | | | |
|---|---|---|---|---|
| 5,330,789 | A | * | 7/1994 | Booth ............... C04B 41/89 427/199 |
| 10,094,236 | B2 | | 10/2018 | Luthra |
| 10,392,312 | B2 | | 8/2019 | Tang et al. |

(Continued)

FOREIGN PATENT DOCUMENTS

| | | |
|---|---|---|
| EP | 3421636 A1 | 1/2019 |
| WO | 2015147960 A1 | 10/2015 |

OTHER PUBLICATIONS

European Search Report for European Application No. 20209848.9 completed May 20, 2021.

*Primary Examiner* — David Sample
(74) *Attorney, Agent, or Firm* — Carlson, Gaskey & Olds, P.C.

(57) ABSTRACT

A gas turbine engine article includes a substrate and an environmental barrier coating (EBC) system disposed on the substrate. The EBC system includes, from the substrate, a dense bond coat layer, a porous bond coat layer, and a topcoat layer in contact with the porous bond coat layer at an interface. The porous bond coat layer includes a matrix, oxygen-scavenging gas-evolution particles dispersed through the matrix, and engineered buffer pores. The oxygen-scavenging gas-evolution particles react with oxygen and generate a gaseous byproduct that diffuses through the interface to escape the EBC system. The engineered buffer pores buffer diffusion of gaseous byproduct to the interface by retaining at least a portion of the gaseous byproduct.

20 Claims, 3 Drawing Sheets

(56) References Cited

U.S. PATENT DOCUMENTS

| | | | |
|---|---|---|---|
| 2013/0108421 A1 | 5/2013 | Sinatra et al. | |
| 2016/0024962 A1* | 1/2016 | Luthra | F01D 25/005 |
| | | | 428/312.6 |
| 2016/0153288 A1 | 6/2016 | Luthra | |
| 2016/0332922 A1* | 11/2016 | Tang | C04B 35/5603 |
| 2018/0371600 A1 | 12/2018 | Li et al. | |

* cited by examiner

ENVIRONMENTAL BARRIER COATING WITH POROUS BOND COAT LAYER

BACKGROUND

Components in a gas turbine engine often include barrier coatings to protect the underlying component from the effects of the severe operating environment. Barrier coatings are available in numerous varieties, which can include thermal barrier coatings and environmental barrier coatings. Thermal barrier coatings are typically designed for maximizing thermal insulation of a component from the surrounding high-temperature environment. Environmental barrier coatings are typically designed for maximizing resistance of infiltration or attack by the environment.

SUMMARY

A gas turbine engine article according to an example of the present disclosure includes a substrate, and an environmental barrier coating (EBC) system disposed on the substrate. The EBC system includes, from the substrate, a dense bond coat layer, a porous bond coat layer, and a topcoat layer in contact with the porous bond coat layer at an interface. The porous bond coat layer includes a matrix, oxygen-scavenging gas-evolution particles dispersed through the matrix, and engineered buffer pores. The oxygen-scavenging gas-evolution particles react with oxygen and generate a gaseous byproduct that diffuses through the interface to escape the EBC system. The engineered buffer pores buffer diffusion of gaseous byproduct to the interface by retaining at least a portion of the gaseous byproduct.

In a further embodiment of any of the foregoing embodiments, the oxygen-scavenging gas-evolution particles are selected from the group consisting of silicon oxycarbide particles, silicon carbide particles, and combinations thereof.

In a further embodiment of any of the foregoing embodiments, the matrix comprises silica.

In a further embodiment of any of the foregoing embodiments, the topcoat layer is selected from the group consisting of oxides, silicates, and combinations thereof.

In a further embodiment of any of the foregoing embodiments, the substrate is silicon-containing.

In a further embodiment of any of the foregoing embodiments, the dense bond coat layer comprises a silica matrix and oxygen-scavenging gas-evolution particles selected from the group consisting of silicon oxycarbide particles, silicon carbide particles, and combinations thereof dispersed through the silica matrix.

In a further embodiment of any of the foregoing embodiments, the porous bond coat layer and the dense bond coat layer have a first volume percentage of the oxygen-scavenging gas-evolution particles, and the porous bond coat layer has a second volume percentage of the pores such that a ratio of the first volume to the second volume is from 3:1 to 1:1.

In a further embodiment of any of the foregoing embodiments, the dense bond coat layer and the porous bond coat layer different in porosity by at least 5 vol. %.

In a further embodiment of any of the foregoing embodiments, the oxygen-scavenging gas-evolution particles have a maximum size of 1-75 micrometers.

In a further embodiment of any of the foregoing embodiments, the pores have a maximum size of 100 micrometers.

In a further embodiment of any of the foregoing embodiments, the pores have a maximum size of 10-25 micrometers.

In a further embodiment of any of the foregoing embodiments, the porous bond coat layer has a surface roughness with peaks at the interface of 150 micrometers to 500 micrometers.

A gas turbine engine article according to an example of the present disclosure includes a substrate, and an environmental barrier coating system disposed on the substrate. The environmental barrier coating system includes, from the substrate, a dense bond coat layer, a porous bond coat layer, and a topcoat layer. Each of the porous bond coat layer and the dense bond coat layer include a matrix, particles selected from the group consisting of silicon oxycarbide particles, silicon carbide particles, and combinations thereof dispersed through the matrix. The porous bond coat layer additionally includes pores. The porous bond coat layer and the dense bond coat layer have a first volume percentage of the particles and a second volume percentage of the pores such that a ratio of the first volume to the second volume is from 3:1 to 1:1.

In a further embodiment of any of the foregoing embodiments, the matrix comprises silica, the topcoat layer is selected from the group consisting of oxides, silicates, and combinations thereof, and the substrate is silicon-containing.

In a further embodiment of any of the foregoing embodiments, the dense bond coat layer comprises a silica matrix and silicon oxycarbide or silicon carbide particles dispersed through the silica matrix.

In a further embodiment of any of the foregoing embodiments, the dense bond coat layer and the porous bond coat layer different in porosity by at least 10 vol. %.

In a further embodiment of any of the foregoing embodiments, the particles in the porous bond coat layer have a maximum size of 1-75 micrometers and the pores have a maximum size of 100 micrometers.

A method for fabricating a gas turbine engine article according an example of the present disclosure includes providing a substrate, and depositing an environmental barrier coating system on the substrate. The environmental barrier coating system includes, from the substrate, a dense bond coat layer, a porous bond coat layer, and a topcoat layer. The porous bond coat layer includes a matrix, oxygen-scavenging gas-evolution particles dispersed through the matrix, and pores. The depositing of the porous bond coat layer includes depositing a slurry onto the substrate. The slurry includes a carrier liquid mixed with the oxygen-scavenging gas-evolution particles and matrix particles. This is followed by removing the carrier fluid to provide a green layer on the substrate, and then thermally consolidating the green layer to produce the porous bond coat layer. The depositing of the porous bond coat layer utilizes at least one pore-influencing process parameter that is selected to increase an amount of the pores in the porous bond coat layer.

In a further embodiment of any of the foregoing embodiments, the at least one pore-influencing process parameter is selected from the group consisting of size of the oxygen-scavenging gas-evolution particles, non-sintering filler particles, sacrificial filler particles, carrier liquid amount, carrier liquid type, and combinations thereof.

In a further embodiment of any of the foregoing embodiments, the depositing of the porous bond coat layer further comprises utilizing at least one surface roughness-influencing process parameter that is selected to increase surface roughness of the porous bond coat layer, and the at least one surface roughness-influencing process parameter is selected from the group consisting of spray rate, size of the oxygen-scavenging gas-evolution particles, slurry spraying pattern, carrier liquid type, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
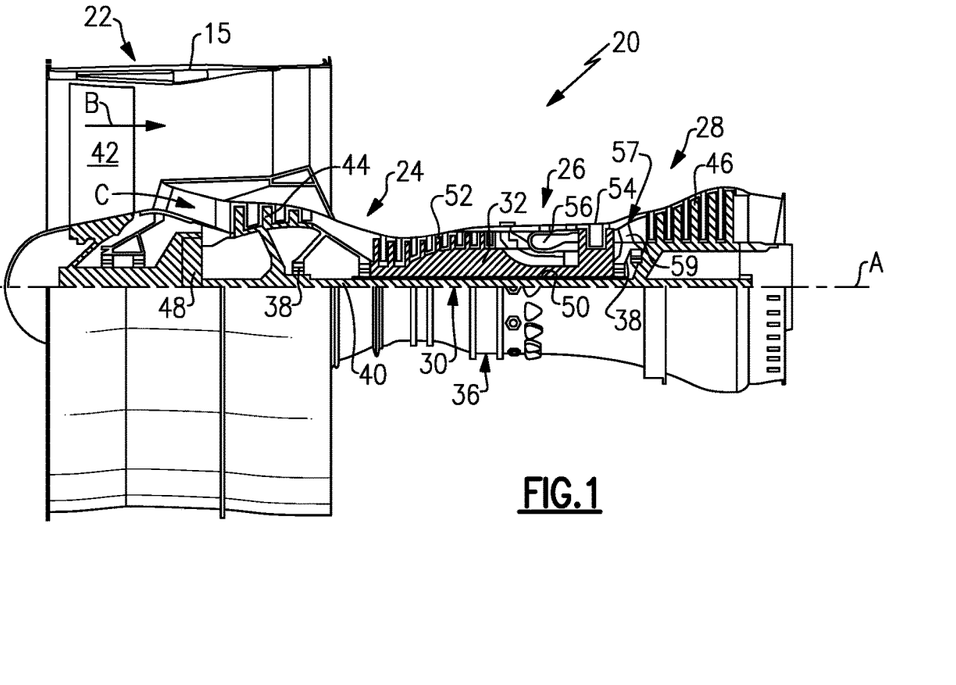
FIG. 1 illustrates a gas turbine engine.
Figure 2:
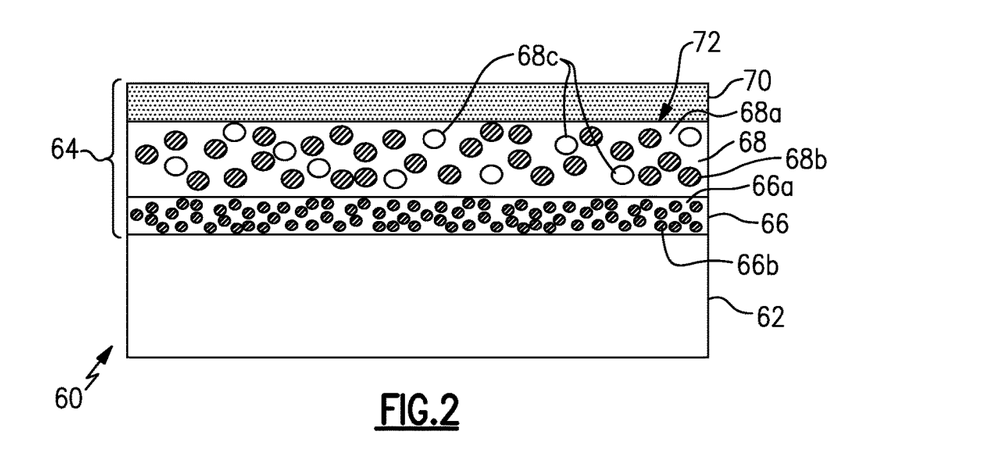
FIG. 2 illustrates a gas turbine engine article.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150 ft/second (350.5 meters/second).

FIG. 2 illustrates an example article 60 of the gas turbine engine 20. For example, although shown schematically, the article 60 may be a turbine blade, a turbine vane, a blade outer air seal, a combustor component, or other component that is subjected to high temperature gases in the engine 20.

The article 60 includes a substrate 62. The substrate 62 is a ceramic material, such as a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix.

The ceramic material of the substrate 62 may be subject to degradation, such as oxidation and steam recession, in the high temperature combustion gases in the core flow path C of the engine 20. In this regard, the article 60 includes an environmental barrier coating system 64 ("EBC system 64") that is disposed on the substrate 62. Most typically, the EBC system 64 is located on the exposed, gas path side of the substrate 62 in the core flow path C of the engine 20.

The EBC 64 includes multiple layers and materials that are designed, for example, to provide structural integrity and resistance to infiltration and/or attack by environmental substances. In the illustrated example, the EBC 64 includes three layers, but it is to be appreciated that additional layers may be used.

The EBC system 64 includes, from the substrate 62 outwards, a dense bond coat layer 66, a porous bond coat layer 68, and a topcoat layer 70. In the example shown, the dense bond coat layer 66 is in contact with the substrate 62, the porous bond coat layer 68 is in contact with the dense bond coat layer 66, and the topcoat 70 is in contact with the porous bond coat layer 68 (at an interface 72). The terms "dense" and "porous" used with regard to the layers 66/68 refer to the porosities of the layers 66/68, namely that the porosities of the layers 66/68 differ by at least 5 vol. % or, in further examples, by at least 10 vol. %.

The topcoat 70 is formed of an oxide, a silicate, or combinations thereof. For example, the topcoat 70 is of a composition that is selected from $HfO_2$, rare earth monosilicate ($RESiO_5$), $HfSiO_4$, $Y_2Si_2O_7$, $Yb_2Si_2O_7$, alkaline earth aluminosilicates ($AEAl_2Si_2O_8$), $Ca_2Y_8(SiO_4)_6O_2$, $Gd_2Hf_2O_7$, $Gd_2Si_2O_7$, or mixtures thereof. Rare earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). Alkaline earth elements include magnesium (Mg), calcium (Ca), strontium (Sr), barium (Ba), and radium (Ra). An example of an alkaline earth aluminosilicate is $Ba_{0.75}Sr_{0.25}Al_2Si_2O_8$ (BSAS).

The dense bond coat layer 66 includes a matrix 66a and oxygen-scavenging gas-evolution particles 66b dispersed through the matrix 66a. Other particles or phases may be used and also dispersed through the matrix 66a, such as but not limited to, barium-magnesium aluminosilicate or glass phases. In one example, the matrix 66a is silica. Oxygen-scavenging gas-evolution particles are those that are reactive with oxygen, usually at temperatures above about 1350° C., and which reaction generates a gaseous byproduct. For example, the particles 66b are, but are not limited to, silicon oxycarbide particles, silicon carbide particles, or combinations thereof. The silicon oxycarbide and/or silicon carbide particles are reactive with oxygen and generate a gaseous carbon dioxide byproduct.

In a further example, the dense bond coat layer 66 is composed, by volume percentage, of 5% to 40% of the matrix 66a and 95% to 60% of the particles 66b. If other phases or particles are used, such phases or particles may be substituted for up to about 5%.

The porous bond coat layer 68 is somewhat similar to the dense bond coat layer 66 in that it also includes a matrix 68a and oxygen-scavenging gas-evolution particles 68b dispersed through the matrix 68a. Other particles or phases may be used and also dispersed through the matrix 68a, such as but not limited to, barium-magnesium aluminosilicate or glass phases. In one example, the matrix 68a is silica. For example, the particles 68b are, but are not limited to, silicon oxycarbide particles, silicon carbide particles, or combinations thereof. The particles 68b have a maximum size of 1-75 micrometers. That is, the largest particles 68b are no greater than 75 micrometers but are typically greater than 1 micrometer. In the illustrated example, the particles 68b are larger than the particles 66b. For instance, the particles 68b have an average particle size of 44 micrometers to 75 micrometers, and the particles 66b have an average size of 1 micrometer to less than 44 micrometers.

In a further example, the porous bond coat layer 68 is composed, by volume percentage, of 5% to 40% of the matrix 68a and 95% to 60% of the particles 68b. If other phases or particles are used, such phases or particles may be substituted for up to about 5%.

The silicon oxycarbide as disclosed herein has silicon, oxygen, and carbon in a covalently bonded network. The network is amorphous and thus does not have long range crystalline structure. For example, at least a portion of the silicon atoms are bonded to both O atoms and C atoms. As can be appreciated, the bonding of the network will vary depending upon the atomic ratios of the Si, C, and O. In one example, the silicon oxycarbide has a composition $SiO_xM_zC_y$, where M is at least one metal, x<2, y>0, z<1, and x and z are non-zero. The metal can include aluminum, boron, transition metals, refractory metals, rare earth metals, alkaline earth metals, or combinations thereof. Silicon carbide particles can be crystalline or amorphous.

Functionally, the topcoat 70 serves as a barrier layer to limit ingress of foreign substances, such as substances from dirt deposits (e.g., calcium-magnesium aluminosilicate), which tend to debit coating durability. The bond coat layers 66/68 serve to facilitate adherence of the topcoat 70 on the substrate 62 and also limit oxygen ingress to the substrate 62. In this regard, the matrices 66a/68a act as an oxygen diffusion barrier, and the oxygen-scavenging gas-evolution particles 66b/68b react with oxygen that does diffuse into the EBC system 64 to limit the oxygen that reaches the substrate 62. The gaseous byproduct (e.g., carbon dioxide) generated in the reaction diffuses through the interface 72 and is released from the EBC system 64 into the surrounding environment.

Despite the ability of the oxygen-scavenging gas-evolution particles 66b/68b to capture oxygen, there are secondary effects that have the potential to debit durability of EBC systems. Namely, the gaseous byproducts can cause local delamination, i.e., blistering, at layer interfaces. In this regard, the porous bond coat layer 68 also includes engineered buffer pores 68c ("pores 68c") that are dispersed though the matrix 68a. The pores 68c retain at least a portion of the gaseous byproduct and thereby act to buffer diffusion of gaseous byproduct to the interface 72. For example, the gaseous byproduct is generated over a period of time. But for the pores 68c, the gaseous byproduct would all diffuse to, and possibly collect at, the interface 72 to cause strain and, potentially, blistering. Instead, however, at least a portion of the gaseous byproduct diffuses into the pores 68c rather than directly to the interface 72. The pores 68c at least temporarily retain or capture at least a portion of the gaseous byproduct, thereby reducing the amount of gaseous byproduct that diffuses directly to the interface 72 so that it is less likely to collect and cause blistering.

The porous bond coat layer 68 is engineered to accommodate the gaseous byproduct, i.e., the pores 68c are engineered. For example, the amount of gaseous byproduct generated is proportional to the volume of all of the oxygen-scavenging gas-evolution particles, which in the illustrated example includes the particles 66b and 68b. There is, therefore, a corresponding volume of pores 68c to retain or capture the gaseous byproduct. Thus, the volume of the pores 68c is controlled with regard to the volume of the particles 66b/68b. In one example, the porous bond coat layer 68 has a first volume percentage of the oxygen-scavenging gas-evolution particles 66b/68b and a second volume percentage of the pores 68c such that a ratio of the first volume to the second volume is from 3:1 to 1:1. For example, the ratio is 3:1 to 2:1 to increase the volume of the oxygen-scavenging gas-evolution particles 66b/68b.

Most typically, for the composition of the porous bond coat layers 66 and 68 disclosed herein, the volume of the pores 68c is from 10% to 30% and the pores 68c are closed (i.e., non-interconnected). In a further example, the pores 68c are also relatively small and have a maximum size of 100 micrometers. That is, the size of the largest pores are no greater than 100 micrometers. The gaseous byproduct may more readily move or diffuse through large pores and therefore smaller pores are desired. In a further example, the maximum size of the largest pores are 10 micrometers to 25 micrometers.

Use of a porosity in the layer 68 at the relatively high levels disclosed herein is counterintuitive to design paradigms of diffusion barrier bond coats layers for environmental barrier coating systems. As such layers are intended to block oxygen ingress, dense coatings are used in order to minimize porosity that would otherwise provide an ingress path for oxygen. However, in examples herein, the porous bond coat layer 68 is used in combination with the dense bond coat layer 66. The layer 66 serves to physically block oxygen ingress. And while the layer 68 also serves to a lesser degree to block physical ingress of oxygen, it is designed for the main function of scavenging oxygen and providing a buffer for the gaseous byproduct that is generated.

Figure 3:
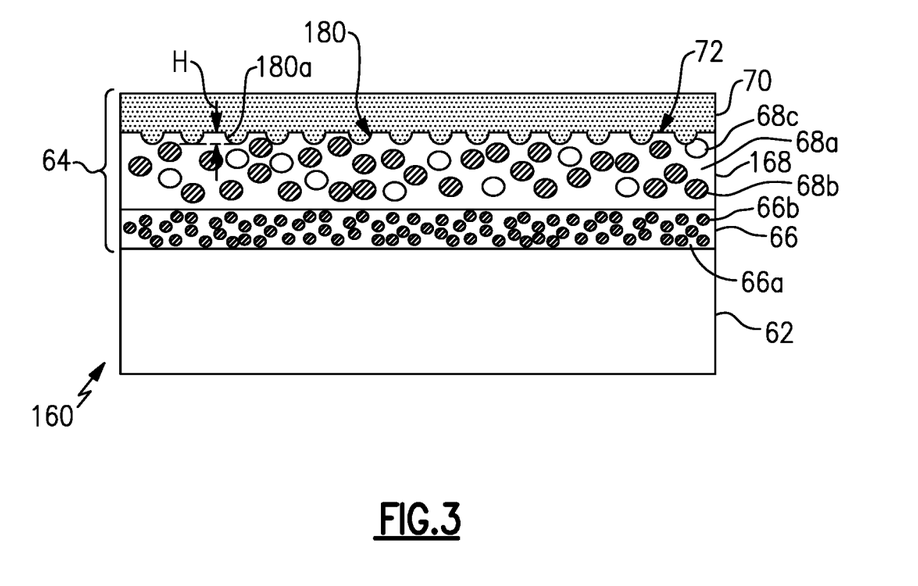
FIG. 3 illustrates another example gas turbine engine article.

FIG. 3 illustrates another example article 160, where like numerals are used to designate like elements. In this example, in comparison to the bond coat layer 68, the porous bond coat layer 168 is engineered to have an increased surface roughness 180. The increased surface roughness 180 provides for increased mechanical interlocking between the topcoat 70 and the layer 168, to facilitate a stronger bond at the interface 72 and further reduce the likelihood of blistering. For example, the surface roughness 180 defines peaks 180a at the interface 72. The peaks 180a have a peak height H of 150 micrometers to 500 micrometers. For instance, the peaks 180a are composed of particles 68b stacked on top of one another (from processing). In this regard, the height H may alternatively be expressed in terms of the size of the particles 68b. For instance, the peak height H is equal to a multiplier factor of the average particle 68b size, such as a factor 2 to 5 times the particle size.

Figure 4:
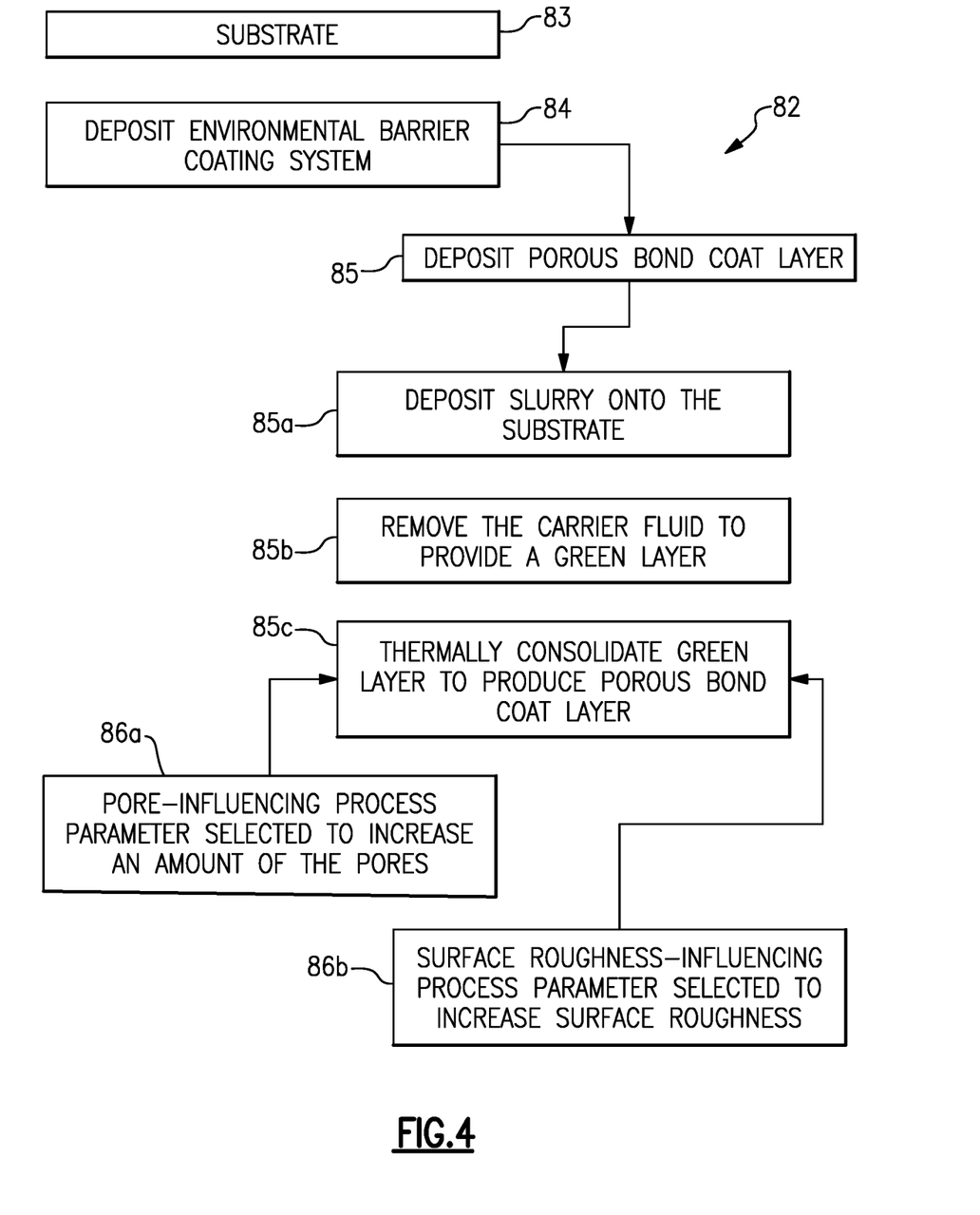
FIG. 4 illustrates a method of fabricating an article.

FIG. 4 illustrates a method 82 for fabricating the gas turbine engine article 60/160 disclosed herein. The method 82 generally includes steps 83 and 84, with sub-steps 85, 85a, 85b, 85c, 86a, and 86b. At step 83 the substrate 62 is provided. For example, the substrate 62 may be provided as a pre-fabricated piece or fabricated as part of the method 82 using known ceramic processing techniques. At step 84, the environmental barrier coating system 64 is deposited on the substrate 62. Typically, as for the EBC system 64, the layers are deposited layer-by-layer, although the focus of the method 82 is on the deposition of the porous bond coat layer 68. The dense bond coat layer 66 may be deposited by a slurry coating technique, and the topcoat 70 may be applied by slurry coating technique or thermal spray technique.

At step 85, which is a sub-step of step 84, the porous bond coat layer 68 is deposited onto the substrate 62, namely onto the prior-deposited dense bond coat layer 66. The deposition of the layer 68 includes at step 85a depositing a slurry onto the substrate 62. The slurry includes a carrier liquid mixed with the oxygen-scavenging gas-evolution particles 68b and matrix particles (to form matrix 68a). If other particles or phases are to be included in the layer 68, particles for those phases are also added in the slurry. As an example, the slurry may be deposited by, but is not limited to, dipping, painting, or spraying.

At step 85b the carrier fluid is removed to provide a green layer on the substrate 62. As an example, the carrier fluid is removed by evaporation, which can be accelerated by heating. Examples carrier fluids include, but are not limited to, water, ethanol, isopropyl alcohol, and acetone.

At step 85c the green layer is thermally consolidated to produce the porous bond coat layer 68. The thermal consolidation may be conducted in a heating chamber in ambient air or in the presence of an inert process gas that is unreactive with regard to the constituents of the layer 68. In one example, the thermal consolidation is conducted at a temperature of 2500° F. in an environment of ambient air for a time of 24 hours. It is to be understood, however, that the temperature and time will depend on the composition of the layer 68.

At step 86a, the depositing of the porous bond coat layer 68 utilizes at least one pore-influencing process parameter to produce the pores 68c, i.e., to increase an amount of the pores 68c in the porous bond coat layer 68. As discussed above, an oxygen barrier layer is typically fabricated to minimize porosity. However, through the one or more pore-influencing process parameters the porosity is increased and controlled to be in the desired range as disclosed herein.

For example, the pore-influencing process parameter is selected from size of the particles 68b, non-sintering filler particles, sacrificial filler particles, carrier liquid amount, carrier liquid type, or combinations of these. As an example of using the size of the particles 68b, both large and small particles (e.g., a bimodal size distribution) are used to obtain high packing density and relatively low porosity. In that regard, a lower amount of the small particles or no small particles can be used to obtain a lower packing density and thus higher porosity in the final layer 68. Additionally, the size of the particles 68b controls the size of the pores 68c. For instance, large particles 68b leave relatively large pores in between the particles, and small particles leave smaller pores. Thus, by using smaller particles, the size of the pores 68c can be controlled to the desired size. In one particular example, the particles 68b have a size distribution of 44 micrometers to 73 micrometers and yield a coating porosity of approximately 25%. In contrast, reducing the particle size range to 44 micrometers to 63 micrometers decreased porosity to approximately 13%. The d90 pore diameter (parameter indicating pore size where 90% of pores are smaller than the listed size) decreased from 10.05 micrometers in the first case to 6.75 micrometers in the second case.

As an example of using non-sintering filler particles, non-sintering filler particles are used in the slurry at step 85a. The non-sintering filler particles are incorporated into the layer 68 but do not sinter at step 85c. As a result, pores remain around the non-sintering filler particles. Examples of non-sintering filler particles include, but are not limited to, hafnium silicate, hafnia, and refractory oxides such as rare earth oxides (e.g., zirconia, yttria, and ytterbium oxide).

As an example of using sacrificial filler particles, sacrificial filler particles are used in the slurry at step 85a. The sacrificial filler particles volatilize in the thermal consolidation step 85c, thereby leaving pores behind. Example sacrificial filler particles include, but are not limited to, carbon or polymer particles.

As an example of using the carrier liquid, the amount and rate of evaporation influence porosity. For instance, relatively slow evaporation provides more time for the particles 68c to settle into a dense packing arrangement. However, by using a carrier liquid that evaporates at a higher rate, less time is provided for settling, resulting in less dense packing and a corresponding increase in porosity. Similarly, using more of the carrier liquid provides for less dense packing and an increase in porosity. In an example, the carrier liquid is ethanol, isopropyl alcohol, or acetone and the slurry contains, by volume, 58% of the carrier liquid.

For the depositing of porous bond coat layer 168, the method 82 additionally includes step 86b to utilize at least one surface roughness-influencing process parameter to produce the pores 68c, i.e., to increase surface roughness of the porous bond coat layer 168. For instance, the surface roughness-influencing process parameter is selected from spray rate, size of the oxygen-scavenging gas-evolution particles, slurry spraying pattern, carrier liquid type, or combinations thereof.

As an example of using the spray rate, a relatively high spray is used to reduce particle agglomeration and surface tensions. In this regard, the method 82 utilizes a relatively low spray rate to promote agglomeration and surface tension. This leads to stacking of particles and higher surface roughness. For instance, the slurry flow rate of 2.5 milliliters per minute produces peak-to-valley heights of 100 micrometers with a mean spacing between peaks ($S_m$) of 200 micrometers to 350 micrometers. Increasing the flow rate to 6.0 milliliters per minute produces peak-to-valley heights of 45 micrometers with mean spacing between peaks of 200 micrometers.

Examples of particle size and carrier liquid type are discussed above and, in addition to increasing porosity, also increase surface roughness.

As an example of slurry spray pattern, spraying is typically conducted to form a uniform smooth green layer. However, the path of the spraying and/or the size of the spray cone is controlled so that the green layer is non-uniform and thereby produces a rough or wavy surface. For instance, in one example, the spray path using a round spray pattern is separated by 25 millimeters center-to-center and the spray cone is 23 millimeters in diameter. This creates regular coating peaks with a peak-to-peak distance ($S_m$) of 25 micrometers and a peak-to-valley distance of 75 micrometers.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   a substrate; and
   an environmental barrier coating (EBC) system disposed on the substrate, the EBC system including, from the substrate, a dense bond coat layer, a porous bond coat layer, and a topcoat layer in contact with the porous bond coat layer at an interface, the porous bond coat layer including a matrix, oxygen-scavenging gas-evolution particles dispersed through the matrix, and engineered buffer pores, the oxygen-scavenging gas-evolution particles reacting with oxygen and generating a gaseous byproduct that diffuses through the interface to escape the EBC system, and the engineered buffer pores buffering diffusion of gaseous byproduct to the interface by retaining at least a portion of the gaseous byproduct.

2. The gas turbine engine article as recited in claim 1, wherein the oxygen-scavenging gas-evolution particles are selected from the group consisting of silicon oxycarbide particles, silicon carbide particles, and combinations thereof.

3. The gas turbine engine article as recited in claim 1, wherein the matrix comprises silica.

4. The gas turbine engine article as recited in claim 1, wherein the topcoat layer is selected from the group consisting of oxides, silicates, and combinations thereof.

5. The gas turbine engine article as recited in claim 1, wherein the substrate is silicon-containing.

6. The gas turbine engine article as recited in claim 1, wherein the dense bond coat layer comprises a silica matrix and oxygen-scavenging gas-evolution particles selected from the group consisting of silicon oxycarbide particles, silicon carbide particles, and combinations thereof dispersed through the silica matrix.

7. The gas turbine engine article as recited in claim 6, wherein the porous bond coat layer and the dense bond coat layer have a first volume percentage of the oxygen-scavenging gas-evolution particles, and the porous bond coat layer has a second volume percentage of the pores such that a ratio of the first volume to the second volume is from 3:1 to 1:1.

8. The gas turbine engine article as recited in claim 1, wherein the dense bond coat layer and the porous bond coat layer different in porosity by at least 5 vol. %.

9. The gas turbine engine article as recited in claim 8, wherein the oxygen-scavenging gas-evolution particles have a maximum size of 1-75 micrometers.

10. The gas turbine engine article as recited in claim 9, wherein the pores have a maximum size of 100 micrometers.

11. The gas turbine engine article as recited in claim 9, wherein the pores have a maximum size of 10-25 micrometers.

12. The gas turbine engine article as recited in claim 1, wherein the porous bond coat layer has a surface roughness with peaks at the interface of 150 micrometers to 500 micrometers.

13. A gas turbine engine article comprising:
   a substrate; and
   an environmental barrier coating system disposed on the substrate, the environmental barrier coating system including, from the substrate, a dense bond coat layer, a porous bond coat layer, and a topcoat layer, each of the porous bond coat layer and the dense bond coat layer including a matrix, particles selected from the group consisting of silicon oxycarbide particles, silicon carbide particles, and combinations thereof dispersed through the matrix, wherein the porous bond coat layer additionally includes pores, the porous bond coat layer and the dense bond coat layer having a first volume percentage of the particles and a second volume percentage of the pores such that a ratio of the first volume to the second volume is from 3:1 to 1:1.

14. The gas turbine engine article as recited in claim 13, wherein the matrix comprises silica, the topcoat layer is selected from the group consisting of oxides, silicates, and combinations thereof, and the substrate is silicon-containing.

15. The gas turbine engine article as recited in claim 13, wherein the dense bond coat layer comprises a silica matrix and silicon oxycarbide or silicon carbide particles dispersed through the silica matrix.

16. The gas turbine engine article as recited in claim 13, wherein the dense bond coat layer and the porous bond coat layer different in porosity by at least 10 vol. %.

17. The gas turbine engine article as recited in claim 16, wherein the particles in the porous bond coat layer have a maximum size of 1-75 micrometers and the pores have a maximum size of 100 micrometers.

18. A method for fabricating a gas turbine engine article, the method comprising:

providing a substrate;

depositing an environmental barrier coating system on the substrate, the environmental barrier coating system including, from the substrate, a dense bond coat layer, a porous bond coat layer, and a topcoat layer in contact with the porous bond coat layer at an interface, the porous bond coat layer including a matrix, oxygen-scavenging gas-evolution particles dispersed through the matrix, and engineered buffer pores, the oxygen-scavenging gas-evolution particles reacting with oxygen and generating a gaseous byproduct that diffuses through the interface to escape the EBC system, and the engineered buffer pores buffering diffusion of gaseous byproduct to the interface by retaining at least a portion of the gaseous byproduct, wherein the depositing of the porous bond coat layer includes depositing a slurry onto the substrate, the slurry including a carrier liquid mixed with the oxygen-scavenging gas-evolution particles and matrix particles, removing the carrier fluid to provide a green layer on the substrate, and thermally consolidating the green layer to produce the porous bond coat layer, wherein the depositing of the porous bond coat layer utilizes at least one pore-influencing process parameter that is selected to increase an amount of the engineered buffer pores in the porous bond coat layer.

19. The method as recited in claim 18, wherein the at least one pore-influencing process parameter is selected from the group consisting of size of the oxygen-scavenging gas-evolution particles, non-sintering filler particles, sacrificial filler particles, carrier liquid amount, carrier liquid type, and combinations thereof.

20. The method as recited in claim 18, wherein the depositing of the porous bond coat layer further comprises utilizing at least one surface roughness-influencing process parameter that is selected to increase surface roughness of the porous bond coat layer, and the at least one surface roughness-influencing process parameter is selected from the group consisting of spray rate, size of the oxygen-scavenging gas-evolution particles, slurry spraying pattern, carrier liquid type, and combinations thereof.

* * * * *